(12) United States Patent
Schory et al.

(10) Patent No.: US 9,152,903 B2
(45) Date of Patent: Oct. 6, 2015

(54) AUTOMATED GENERATION OF QR CODES WITH EMBEDDED IMAGES

(75) Inventors: Guy Schory, San Francisco, CA (US); Robert Dean Veres, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/289,898

(22) Filed: Nov. 4, 2011

(65) Prior Publication Data

US 2013/0112760 A1 May 9, 2013

(51) Int. Cl.
*G06K 19/06* (2006.01)

(52) U.S. Cl.
CPC .... *G06K 19/06037* (2013.01); *G06K 19/06046* (2013.01); *G06K 19/06103* (2013.01)

(58) Field of Classification Search
CPC .............................................. G06K 19/06103
USPC .................................................. 235/383, 494
See application file for complete search history.

(56) References Cited

U.S. PATENT DOCUMENTS

| | | | |
|---|---|---|---|
| 2005/0011958 A1* | 1/2005 | Fukasawa et al. | 235/462.46 |
| 2006/0097062 A1* | 5/2006 | Cheong et al. | 235/494 |
| 2006/0215931 A1* | 9/2006 | Shimomukai | 382/284 |
| 2008/0048044 A1* | 2/2008 | Zhao et al. | 235/494 |
| 2010/0114736 A1* | 5/2010 | Lewis et al. | 705/27 |
| 2013/0021364 A1* | 1/2013 | Azuma et al. | 345/589 |
| 2013/0026239 A1* | 1/2013 | Sakahashi et al. | 235/494 |

FOREIGN PATENT DOCUMENTS

WO      WO 2011118540 A1 *   9/2011

OTHER PUBLICATIONS

Instructables, "Put Images Inside QR Codes", Dec. 6, 2010 [retrieved on Jan. 25, 2013] Retrieved from the Internet: <URL: http://web.archive.org/web/20101206075656/http://www.instructables.com/id/Put-images-i nside-QR-codes/step2/Generate-a-OR-code>.*

* cited by examiner

*Primary Examiner* — Thien T Mai
*Assistant Examiner* — Toan Ly
(74) *Attorney, Agent, or Firm* — Schwegman Lundberg & Woessner, P.A.

(57) ABSTRACT

Systems and methods for the automated generation of QR codes with embedded images therein are provided. The QR code has an active, machine-readable portion and a background portion. An example system comprises an image identification module to identify a human-readable image. A primitive creation module generates a primitive QR code. The primitive QR code comprises a machine-readable QR code having the image embedded in the QR code. An overlay interface module generates an intermediate QR code by modifying the active portion of the QR code using a first modification and modifying the background portion using a second modification.

18 Claims, 6 Drawing Sheets

AUTOMATED GENERATION OF QR CODES WITH EMBEDDED IMAGES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011 eBay, Inc., all rights reserved.

TECHNICAL FIELD

This patent document pertains generally to data communications, and more particularly, but not by way of limitation, to the automatic generation of QR codes with embedded images.

BACKGROUND

Quick response (QR) codes are a matrix bar code that stores data in two dimensions. Each QR code includes position, alignment, and timing information that is used by a QR code reader to read information stored by the QR code.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

QR codes are used to store information in such a way that the information can be read using a machine called a QR code reader. QR codes can be quickly generated using a software program installed on a machine. A smart phone or other mobile communication device equipped with a camera can be easily configured to read QR codes. Because QR codes are easy to generate and can store at least ten alphanumeric characters, QR codes may be used to store an address of an Internet website.

As such, QR codes are becoming ubiquitous in printed media, including media published online. QR codes may be printed on newspapers, magazines, advertisements, flyers, business cards, signs, containers, and other surfaces. QR codes may be projected onto a screen or other surface (e.g., a building). QR codes may be displayed on a computer screen, touch screen, or the like. QR codes comprise an active portion readable by a machine that is typically black and a background portion that provides contrast to the active portions and is typically white.

Figure 5:
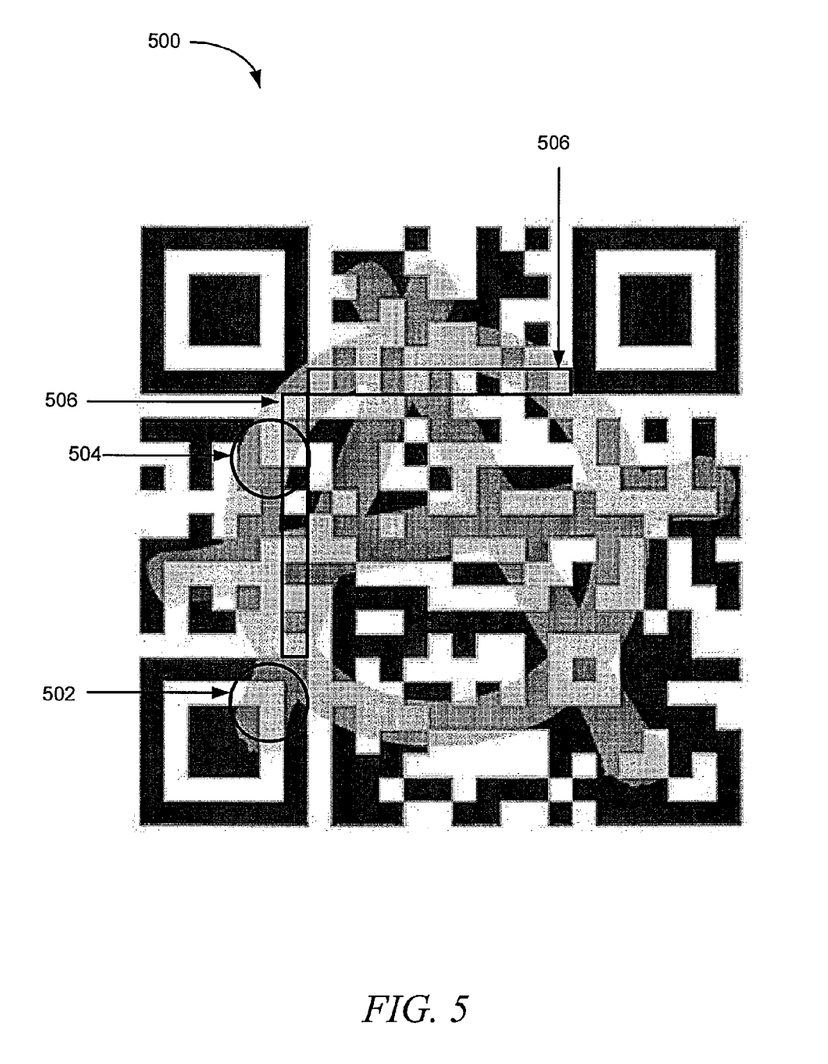
FIG. 5 is an example of a QR code having an image embedded therein.

QR codes include timing information encoded in a required pattern (see, e.g., FIG. 5, reference number 506). The timing information includes a sequence of alternating black and white segments along a designated horizontal and a vertical portion of the QR code. Some publishers of QR codes may insert an image into the QR code, and maintain the machine-readability of the QR code, by interrupting the timing information. For example, the publisher may insert a series of all black or all white segments into the timing information causing the portions of the QR code corresponding to the inserted picture to be ignored by the QR code reader.

Because a user may be exposed to a large number of QR codes, the user may ignore or disregard a QR code. Further, a user may download or save a QR code for later access knowing a website identified by the QR code at the time of the download. However, the QR code is not readable by a human so the user may later forget the reason for downloading a particular QR code. In some instances, the user may simply delete the QR code without reading it or may re-download the QR code. A user may also receive a QR code from another user in, for example, an email or image message but the received QR code may not include a label or other human-readable identifier for the user to determine the nature of the information stored by the QR code.

As such, it is desirable to add human-readable information to a machine-readable QR code without corrupting the machine-readable information. The human-readable information is embedded into the QR code so that an image is discernable to the user but is invisible to a machine.

Figure 1:
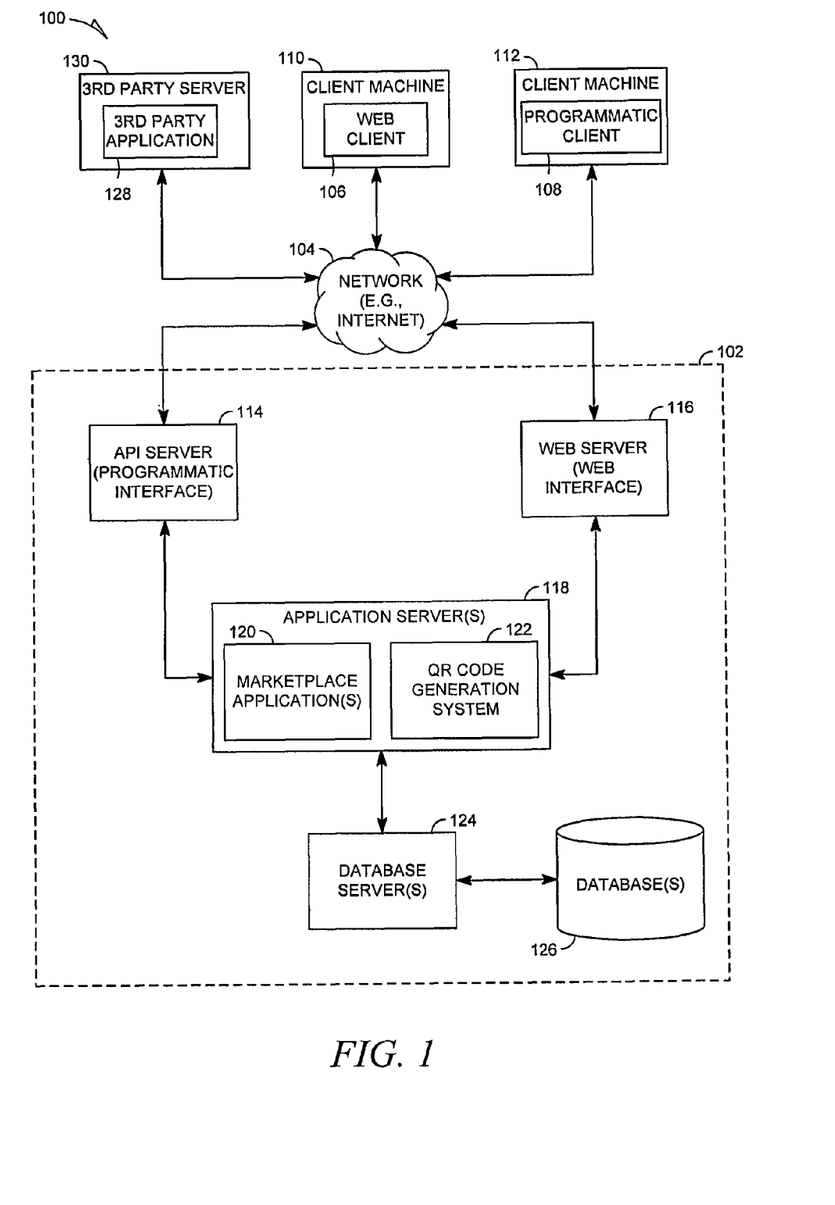
FIG. 1 is a block diagram illustrating an example network environment in which various embodiments may be implemented.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and a QR code generation system 122. The application servers 118 are, in turn, shown to be coupled to one or more databases servers 124 that facilitate access to one or more databases 126.

The marketplace applications 120 may provide a number of marketplace functions and services to users that access the networked system 102. The marketplace applications 120 may publish or distribute QR codes as online content. The QR code generation system 122 may accordingly provide a QR generation and modification service to the marketplace applications 120 or to users. While the marketplace applications 120 and the QR code generation system 122 are shown in FIG. 1 to both form part of the networked system 102, it will be appreciated that, in alternative embodiments, the QR code generation system 122 may form part of a QR code provisioning system that is separate and distinct from the networked system 102.

Further, while the system 100 shown in FIG. 1 employs a client-server architecture, the present invention is of course not limited to such an architecture, and could equally well find application in a distributed or peer-to-peer architecture system, for example. The various marketplace applications 120 and the QR code generation system 122 can also be implemented as standalone software programs, which do not necessarily have networking capabilities.

The web client 106 accesses the various marketplace applications 120 and the QR code generation system 122 via the web interface supported by the web server 116. Similarly, the programmatic client 108 accesses the various services and functions provided by the marketplace applications 120 and the QR code generation system 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
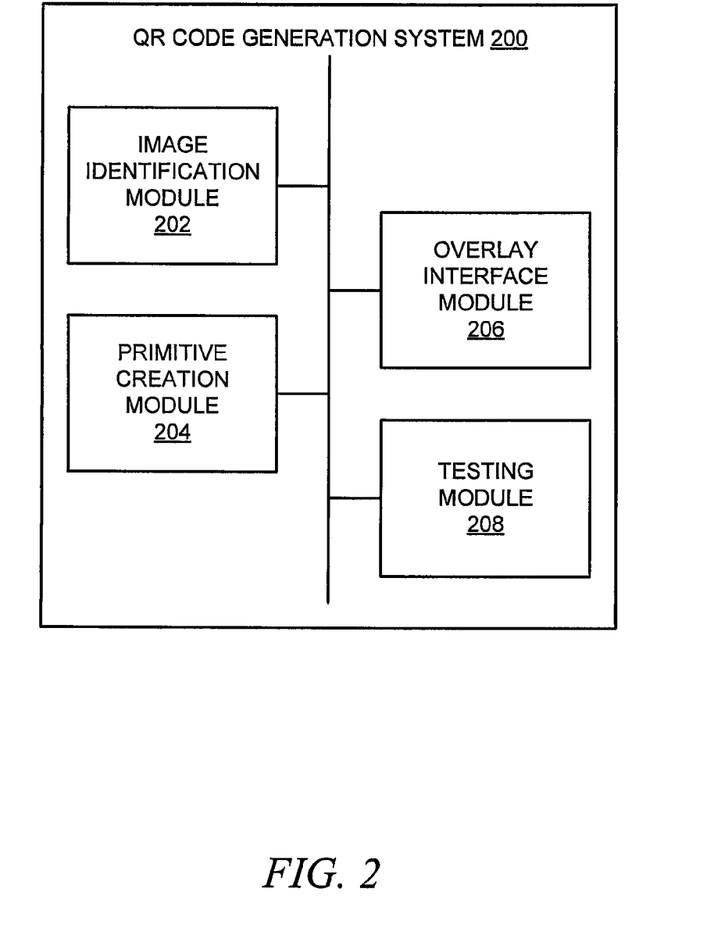
FIG. 2 is a diagrammatic representation of a QR code generation system, according to an example embodiment.

FIG. 2 is a diagrammatic representation of a QR code generation system 200, according to an example embodiment. In some instances, the QR code generation system 200 is the QR code generation system 122. In other instances, the QR code generation system 200 may be a stand-alone system or be implemented to provide a web-based service. The QR code generation system 200 may comprise a number of modules implemented in hardware, software, or a combination of hardware and software. The QR code generation system 200 generates a machine-readable QR code having a human-readable image embedded therein.

An image identification module 202 is configured to identify an image to be embedded in a QR code. The image may be received as a selection from a user, may be generated by the user, or may be otherwise identified. The image may include one or more alphanumeric characters. The image identification module 202 may evaluate the image to determine that the image meets one or more requirements before being embedded. These requirements may include a minimum resolution, a maximum number of colors, a maximum size, or the like.

A primitive creation module 204 is configured to generate a primitive QR code based on the identified image. Prior to generating the primitive QR code, the primitive creation module 204 may resize the image so that the image has the same dimensions as the QR code. If the image has larger dimensions than the QR code, the primitive creation module 204 may shrink or crop the image. If the image has smaller dimensions than the QR code, the primitive creation module may expand or magnify the image or add a border around the image.

The primitive QR code comprises a first iteration of a QR code having an image embedded therein. The primitive QR code may include a QR code that is not necessarily machine-readable and an image that is not necessarily human-readable. The primitive QR code may be generated in a variety of ways. For example, the primitive QR code may be generated according to a version of the QR code selected by the user, or a version of the QR code may be automatically selected based on a number of alphanumeric characters to be encoded in the QR code.

For example, the primitive may be generated by creating a machine-readable QR code on a solid-color background (e.g., creating a black-color QR code on a white background) and overlaying the image onto the generated QR code. The solid-color background may be white, black, or another color. The color of the solid-color background may be selected based on a characteristic of the image. For example, if the image contains mostly dark colors, the solid-color background may be black. The QR code itself may appear white on the black background. If the image contains mostly light colors, a white background and black QR code may be selected. In some instances, the brightness of the image may be determined automatically or be received as an input from the user.

In other embodiments, the QR code may be generated on the image so that the image itself is the background of the generated QR code. The image may be analyzed to determine if the image contains mostly dark colors or mostly light colors. If the image contains mostly light colors, the QR code may be generated in black. If the image contains mostly dark colors, the QR code may be generated in white. The QR code may be generated in other colors as well.

The primitive QR code may not necessarily be human-readable or machine-readable. The primitive QR code may include any number of colors or textures. Further, the primitive QR code may have boundaries that do not vary from a QR code that has a typical white or black background. For example, the primitive QR code may have a same square shape as a typical QR code.

After the primitive QR code is generated, an overlay interface module 206 of the QR code generation system 200 may generate a user interface to display the primitive QR code. The overlay interface module 206 is further configured to receive input from a user that is used to modify the primitive QR code to generate a final QR code.

Unlike existing graphics engines or applications, the overlay interface module 206 is configured to identify locations within the primitive QR code that form part of the machine-readable QR code and distinguish those locations from portions of the primitive QR code that correspond to the embedded image. The overlay interface module 206 further, in response to a single user input, automatically modifies portions of, or the entirety of, the primitive QR code differently. It is noted that, one or more modifications may be made sequentially to the primitive QR code. Each modification may result in an intermediate QR code that may be further modified by the user and/or the overlay interface module 206.

The overlay interface module 206 may provide one or more mechanisms used to modify the primitive QR code or the intermediate QR code. For example, the overlay interface module 206 may provide a mechanism whereby the user may modify a property of the primitive QR code or the intermediate QR code. For example, the mechanisms may include a tool for adjusting a saturation level, a brightness level, or a contrast level within the primitive or intermediate QR code.

The mechanisms may allow the user to dictate that a background portion of the primitive QR code or intermediate QR code is modified independently from the generated QR code itself. Conversely, the mechanisms may allow the user to dictate that the generated QR code of the primitive QR code or intermediate QR code is modified independently from the background. In some instances, the background may be modified without modifying the QR code and the QR code may be modified without modifying the background.

A testing module 208 determines whether the primitive QR code or intermediate QR code is machine-readable. The testing module 208 accesses the primitive QR code or intermediate QR code and provides an indication of whether the tested QR code is machine-readable. In some instances, the testing module 208 provides an indication that includes the decrypted alphanumeric characters read from the QR code. In some embodiments, the overlay interface module 206 may automatically request that each intermediate QR code be tested. The overlay interface module 206 may provide the indication as to whether the tested QR code is machine-readable within the user interface generated by the overlay interface module 206.

Figure 3:
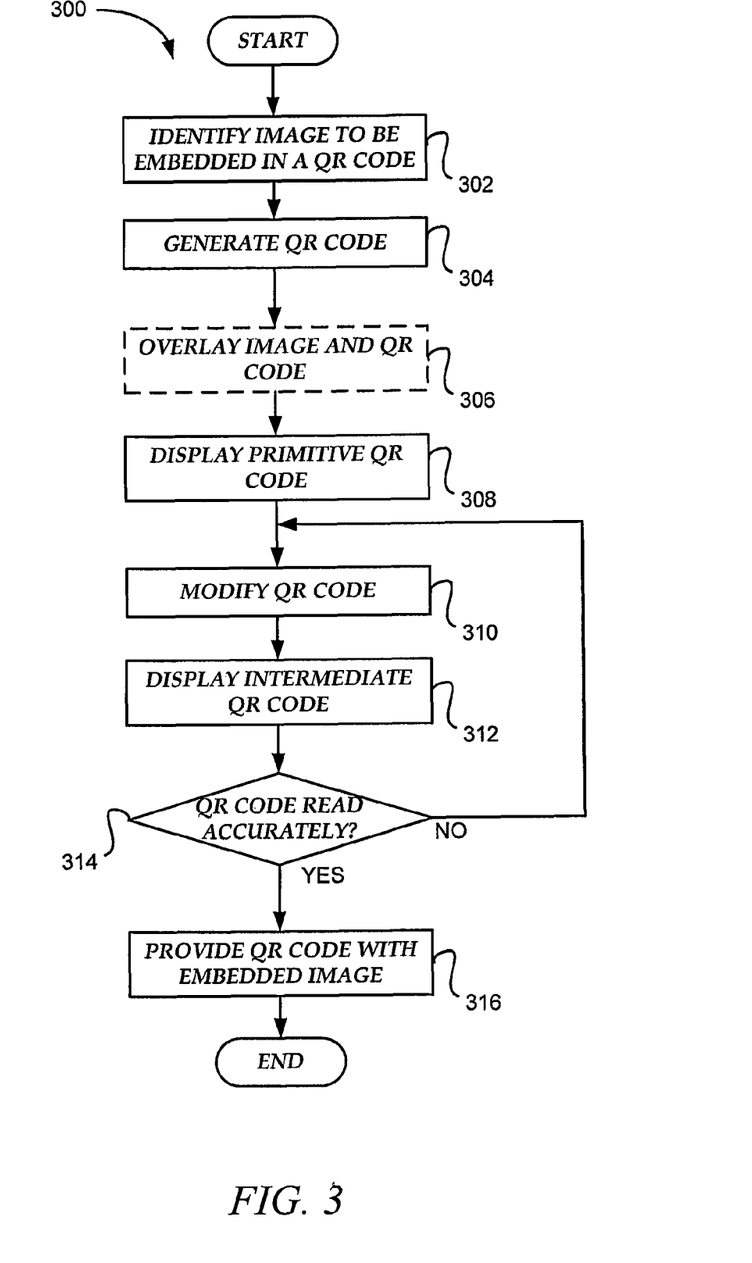
FIG. 3 is a flow chart illustrating a method to embed an image in a QR code, according to an example embodiment.

FIG. 3 is a flow chart illustrating a method 300 to embed an image in a QR code, according to an example embodiment. The method 300 may be performed by the QR code generation system 200. The method 300 may be performed automatically, without human intervention, using one or more machines. In some embodiments, the method 300 may be performed via one or more Internet websites.

In an operation 302, an image to be embedded in a QR code is identified by the image identification module 202. The image may be manually identified by a user or may be automatically identified by a machine. For example, if a QR is to be generated to identify an Internet website having a listing describing items for sale, a machine may automatically identify an image of the item from a plurality of images of the item. In some embodiments, the image may be resized to match the dimensions of the QR code.

In an operation 304, a QR code is generated by the primitive creation module 204. The QR code may be generated as a black QR code on a white background, as a white QR code on a black background, or as a QR code on the image. In embodiments where the image is the background used to generate the QR code, the QR code may be black, white, or any other color. The color of the QR code may be determined based on one or more colors included in the image or a distribution of the colors included in the image. The color may be determined manually by a user or automatically by the primitive creation module 204 based on an analysis of the image.

If the QR code is generated on a white background or a black background, the image is overlaid with the QR code in an optional operation 306. The QR code may be overlaid with the image or the image may be overlaid with the QR code by the primitive creation module 204. In some instances, the user may provide one or more inputs that affect the image overlay. For example, a user may dictate a percent transparent of the image or the QR code.

In an operation 308, a primitive QR code is displayed to the user in a graphical user interface by the overlay interface module 206. The primitive QR code may or may not be machine-readable. Further, the image may or may not be human-readable. By "not human-readable," the image may not be discernable from the QR code by a human or the image may not be readily recognizable by the human. In instances where the image comprises one or more alphanumeric characters, the characters may not be readable by a human.

In an operation 310, the primitive QR code is modified according to one or more available modifications. The modification may be selected automatically, without human intervention, or manually by a user. The modifications may affect the entire QR code and image, or only a portion of the QR code. The affected portion may be the image (e.g., portions of the background of the QR code) or the QR code. Some modifications may affect both the image and the QR code but affect both portions differently.

In one example, an available modification may operate to change a color saturation level of the image and the QR code. To illustrate, if the image is a red symbol on a white background, a black QR code may be generated. The black QR code may overlap or block both white and red portions of the image. The modification to change the color saturation level may cause the red portions of the image blocked by the black QR code to be changed into a more saturated (e.g., darker) red. The modification may further cause the white portions of the image blocked by the black QR code to be turned into a less saturated (e.g., lighter) red.

In some instances, different portions of the QR code or image may be modified differently. For example, an image may include a foreground and a background. A user or a machine may determine the portions of the image corresponding to the foreground and the background, respectively. The QR code may overlap portions of both the foreground and the background. In these instances, the portions of the foreground that overlap the QR code may be modified differently that the portions of the background that overlap the QR code. Likewise, the portions of the QR code that overlap with the foreground of the image may be modified differently than portions of the QR code that overlay with the background of the image.

In an operation 312, the modified QR code is displayed to the user as an intermediate QR code in a user interface. The intermediate QR code may or may not be machine-readable or human-readable. The intermediate QR code may have the same dimensions as the QR code of operation 304 and the primitive QR code of operation 308.

In an operation 314, a determination is made as to whether the intermediate QR code is readable by a machine. The user interface may include an indication as to whether the QR code is machine-readable. A further determination may be made by the user as to whether the intermediate QR code is readable by a human (e.g., the user). To be human-readable, the user may determine whether he can discern the image from the QR code.

If the intermediate QR is not readable by the machine or the user, the method 300 returns to operation 310 to further modify the QR code. The intermediate QR code may undergo any number of modifications, repeating operations 310, 312, and 314 any number of times. The QR code may be further modified if it is not machine-readable, if it is not human-readability, or to improve the readability of the intermediate QR code.

In an operation 316, if the QR code can be accurately read by a machine, the QR code with the embedded image is provided to the user. The QR code with an embedded image may be a downloadable image file that can be distributed over a data communication network or a printable image that can be printed on one or more objects.

Figure 4:
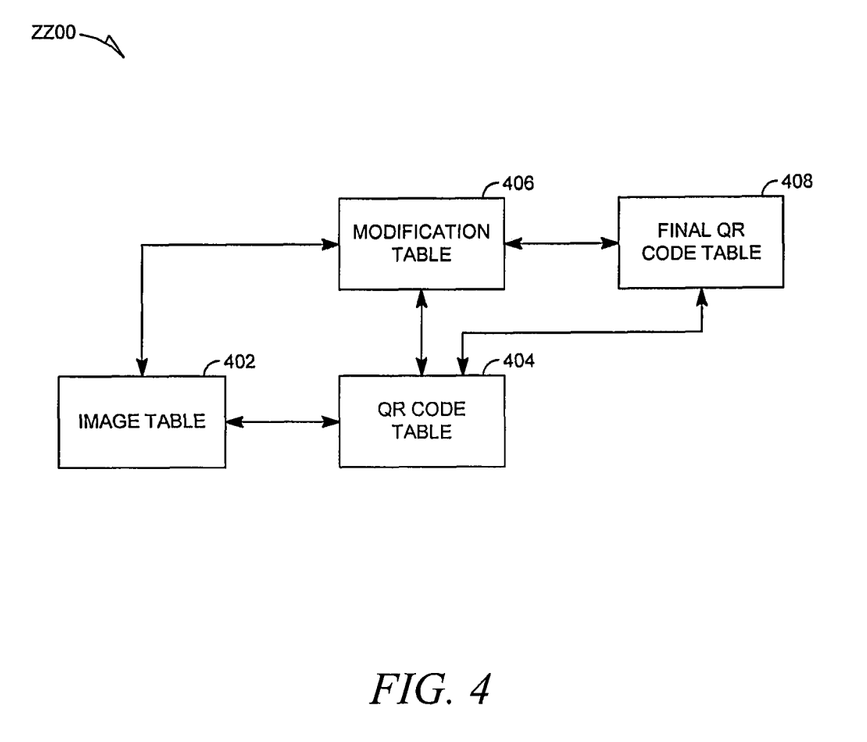
FIG. 4 is a high level diagram of one or more example tables that may be maintained according to an example embodiment.

FIG. 4 is a high level diagram of one or more example tables that may be maintained in the databases 126 that are utilized by the QR code generation system 200 according to an example embodiment.

An image table 402 contains information about the image. The information may include an image file or a pointer to an image file. An image file is composed of pixels, vector (geometric) data, or a combination of the two. The pixels that constitute an image are ordered as a grid (columns and rows); each pixel consists of numbers representing magnitudes of brightness and color. The image table 402 may include resizing information about the image for changing the dimensions of the image so that it matches he dimensions of a QR code. The image table 402 may further include an indication corresponding to each pixel that indicates whether the pixel is in the foreground or the background of the image. In some embodiments, the image may have multiple layers, in addition to the foreground and the background.

A QR code table 404 contains information about the QR code. In some embodiments, the QR code may be an image file. In some instances, for each pixel in the QR code, the QR code table 404 may include an additional indication as to whether the pixel is part of the QR code (e.g., the black portions of the QR code) or part of the background of the QR code (e.g., the white background of the QR code).

A modification table 406 contains information about the primitive QR codes and/or intermediate QR codes generated by the QR code generation system 200. The modification table 406 may comprise an image file or include a pointer to an image file used to store the intermediate QR code. The modification table 406 may include, for each pixel, additional pieces of information. The first additional piece of information may include an indication as to whether the pixel in the intermediate QR code corresponds to a pixel in the image background or the image foreground. The second additional piece of information may include an indication as to whether the pixel in the intermediate QR code corresponds to a pixel in the QR code or the background of the QR code.

A final QR code table 408 contains information about the QR code with the embedded image provided to the user. The final QR code table 408 may comprise an image file having a readily available file format. The final QR code table 408 may not include the additional information included in the modification table 406.

FIG. 5 is an example of a QR code having an image embedded therein 500. As depicted, the QR code is depicted as having an image of a circled red "A" on a white background. The QR code and the image have approximately the same dimensions. The QR code appears as a whole and is not divided into two or more portions. However, in other embodiments, the QR code may be divided into two or more portions where the embedded image appears within one or more of the portions.

In the image, the "A" is the foreground of the image while the circle around the "A" is a background of the image. The image may have a second, white background or the QR code itself may be generated on a white background that appears as the background in QR code 500.

The circled portion 502 encloses a machine-readable portion of the QR code 500 where the foreground of the image overlaps with a portion of the QR code. As depicted, the portions of the image foreground that overlap with a black portion of the QR code are a bright, tomato red in the portion 502. In the portion 502, the portions of the image foreground that overlap with the white background of the QR code are a lighter, pink color.

The circled portion 504 encloses a machine-readable portion of the QR code 500 where the background of the image overlaps with a portion of the QR code. As depicted, the portions of the image background that overlap with a black portion of the QR code are a darker, burgundy red in the portion 502. In the portion 504, the portions of the image foreground that overlap with the white background of the QR code are a lighter, gray color.

It is further noted that part of circled portion 504 of the embedded image overlaps with timing information included in the QR code. Boxes 506 indicate the location of the timing information within the QR code. The timing information is a series of alternating active and background portions of the QR code. As shown, the image is embedded in the QR code 500 without interrupting the timing pattern with a series of two or more active portions or two or more background portions of the QR code. As such, the timing portion of the QR code is said to be continuous. The original dimensions of the generated QR code are maintained after the image is embedded into the QR code.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
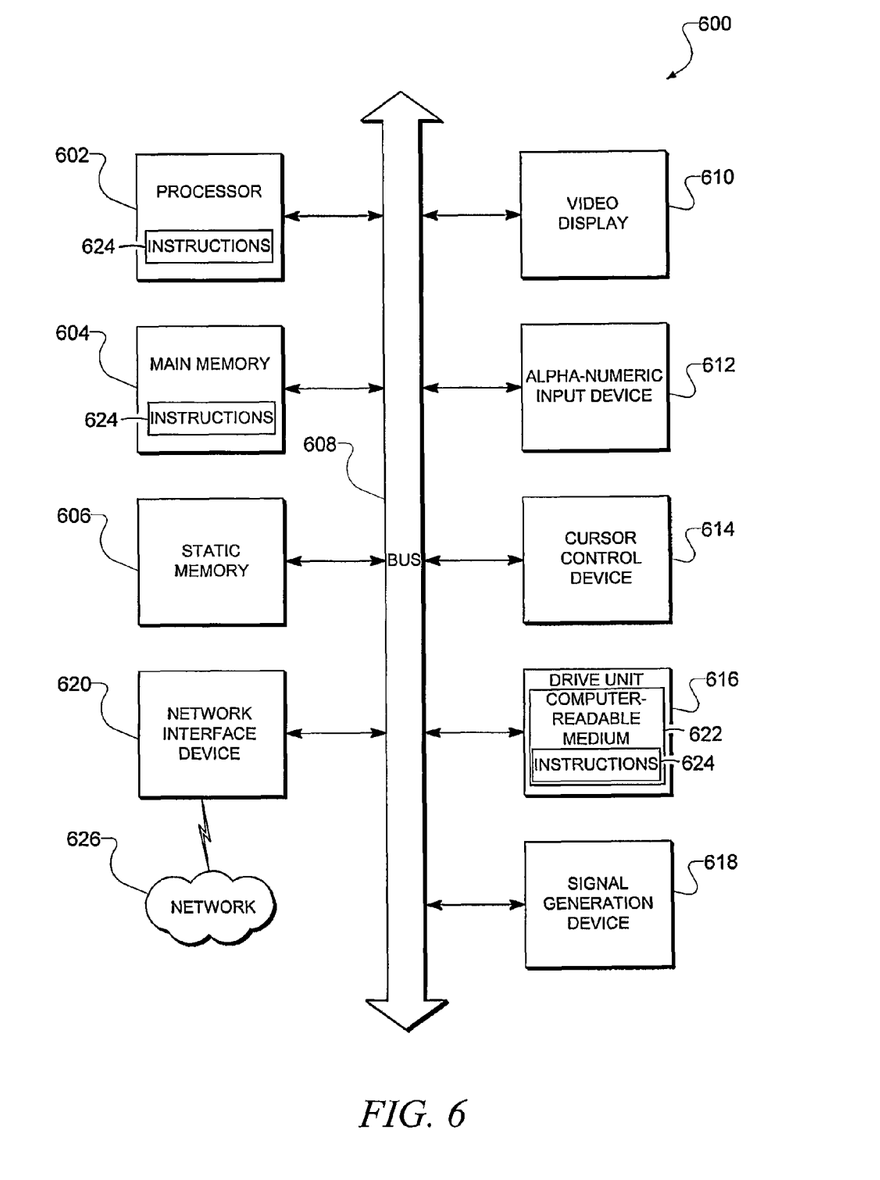
FIG. 6 is a block diagram of machine in the example form of a computer system within which a set instructions, for causing the machine to perform any one or more of the methodologies discussed herein, may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD), a cathode ray tube (CRT), or a touch screen). The computer system 600 also includes an alphanumeric input device 612 (e.g., a keyboard or a touch screen), a user interface (UI) navigation device 614 (e.g., a mouse or a touch screen), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
an image identification module configured to automatically identify a human-readable image of an item from a sales listing describing the item;
a primitive creation module configured to generate a primitive QR code, the primitive QR code comprising a machine-readable QR code having the human-readable image embedded therein, the primitive QR code having an active portion and a background portion, a color of the active portion of the primitive QR code being automatically selected based on an evaluation of a color distribution of the human-readable image, the machine-readable QR code identifying an Internet website showing the sales listing; and
an overlay interface module configured to:
display the primitive QR code;
receive a user command;
in response to receiving the user command, modify the primitive QR code to generate an intermediate QR code by modifying the active portion of the primitive QR code using a first modification and modifying the background portion using a second modification, the first modification and the second modification each being selected from the group consisting of a saturation modification, a brightness modification, and a contrast modification; and
a testing module configured to:
verify that the intermediate QR code is machine-readable; and
based on the verification, provide the intermediate QR code to the user.

2. The system of claim 1, wherein the primitive creation module is configured to generate the primitive QR code by overlaying the image onto the machine-readable QR code.

3. The system of claim 1, wherein the primitive creation module is configured to generate the primitive QR code by overlaying the machine-readable QR code onto the image.

4. The system of claim 1, wherein the image identification module is configured to identify a background of the image and a foreground of the image.

5. The system of claim 4, wherein the overlay interface module is configured to modify the background of the image using a third modification and to modify the foreground of the image using a fourth modification.

6. The system of claim 1, wherein the image, the machine-readable QR code, and the primitive QR code have approximately the same dimensions.

7. The system of claim 1, wherein the image within the intermediate QR code is human-readable and overlaps with one or more machine readable portions of the intermediate QR code.

8. The system of claim 1, wherein the overlay interface module is to access a QR code table that includes an indication, for each pixel of the primitive QR code, whether the pixel corresponds to the active portion of the primitive QR code.

9. The system of claim 1, wherein the overlay interface module is to access an image table that indicates, for each pixel of the image, a layer of the image corresponding to the pixel.

10. The system of claim 1, wherein the overlay interface module is to access a modification table that indicates, for each pixel of the intermediate QR code, whether the pixel corresponds to the active portion of the intermediate QR code and a layer of the image corresponding to the pixel.

11. The system of claim 1, wherein the timing information encoded in the primitive QR code is a continuous series of alternating active portions and background portions.

12. The system of claim 1, wherein the primitive creation module is configured to resize the image so that the image has the same dimensions as the machine-readable QR code.

13. The system of claim 1, further comprising an image evaluation module configured to determine if the image meets one or more embedding requirements.

14. A method comprising:
identifying a human-readable image of an item from a sales listing describing the item;
generating a primitive QR code, the primitive QR code comprising a machine-readable QR code having the human-readable image embedded therein, the primitive QR code having an active portion and a background portion, a color of the active portion of the primitive QR code being automatically selected based on an evaluation of a color distribution of the human-readable image, the machine-readable QR code identifying an Internet website showing the sales listing;
displaying the primitive QR code;
receiving a user command;
in response to receiving the user command, modifying the primitive QR code to generate an intermediate QR code by modifying the active portion of the primitive QR code using a first modification and modifying the background portion using a second modification, the first modification and the second modification each being selected from the group consisting of a saturation modification, a brightness modification, and a contrast modification;
verifying that the intermediate QR code is machine-readable; and
based on the verification, providing the intermediate QR code to the user.

15. The method of claim 14, further comprising generating the primitive QR code by overlaying the image onto the machine-readable QR code.

16. The method of claim 14, further comprising generating the primitive QR code by overlaying the machine-readable QR code onto the image.

17. The method of claim 14, further comprising accessing a modification table that indicates, for each pixel of the intermediate QR code, whether the pixel corresponds to the active portion of the intermediate QR code.

18. A non-transitory machine-readable medium having instructions embodied thereon, the instructions executable by one or more machines to perform operations comprising:
identifying a human-readable image of an item from a sales listing describing the item;
generating a primitive QR code, the primitive QR code comprising a machine-readable QR code having the image embedded therein, the primitive QR code having an active portion and a background portion, a color of the active portion of the primitive QR code being automatically selected based on an evaluation of a color distribution of the image, the machine-readable QR code identifying an Internet website showing the sales listing;
displaying of the primitive QR code;
receiving a user command;
in response to receiving the user command, modifying the primitive QR code to generate an intermediate QR code by modifying the active portion of the primitive QR code using a first modification and modifying the background portion using a second modification, the first modification and the second modification each being selected from the group consisting of a saturation modification, a brightness modification, and a contrast modification;
verifying that the intermediate QR code is machine-readable; and
based on the verification, providing the intermediate QR code to the user.

* * * * *